US012236382B2

(12) United States Patent
Young et al.

(10) Patent No.: US 12,236,382 B2
(45) Date of Patent: Feb. 25, 2025

(54) SYSTEM AND GRAPHICAL USER INTERFACE FOR PROVIDING STORE-LEVEL DIAGNOSTICS AND REMEDIATION

(71) Applicant: STARBUCKS CORPORATION, Seattle, WA (US)

(72) Inventors: Kathryn K. Young, Seattle, WA (US); Marc A. Chappron, Issaquah, WA (US); Frank F. Britt, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/222,179

(22) Filed: Jul. 14, 2023

(65) Prior Publication Data

US 2025/0021912 A1 Jan. 16, 2025

(51) Int. Cl.
*G06Q 10/00* (2023.01)
*G06N 20/00* (2019.01)
*G06Q 10/0639* (2023.01)
*G06Q 10/20* (2023.01)

(52) U.S. Cl.
CPC ....... *G06Q 10/06393* (2013.01); *G06N 20/00* (2019.01); *G06Q 10/20* (2013.01)

(58) Field of Classification Search
CPC ...................................................... G06N 20/00
See application file for complete search history.

(56) References Cited

U.S. PATENT DOCUMENTS

| 9,959,015 | B2 * | 5/2018 | Fletcher | G06F 3/04842 |
| 11,093,518 | B1 * | 8/2021 | Lu | G06F 11/3476 |
| 2003/0149613 | A1 * | 8/2003 | Cohen | G06Q 10/06398 |
| | | | | 705/7.42 |
| 2008/0086359 | A1 * | 4/2008 | Holton | G06Q 30/0201 |
| | | | | 705/7.29 |
| 2008/0189632 | A1 * | 8/2008 | Tien | G06Q 30/02 |
| | | | | 702/182 |
| 2011/0258011 | A1 * | 10/2011 | Burns | G06Q 50/12 |
| | | | | 705/15 |

(Continued)

OTHER PUBLICATIONS

PCT Search Report and Written Opinion for PCT/US2024/037148 mailed Oct. 2, 2024.

*Primary Examiner* — Rutao Wu
*Assistant Examiner* — Tyrone E Singletary
(74) *Attorney, Agent, or Firm* — Kilpatrick Townsend & Stockton LLP (57) ABSTRACT

In some examples, a system can generate a graphical user interface indicating that a first hierarchical level is assigned to a store based on metric values computed for the store using a set of data related to the store. The first hierarchical level can be a level in a predefined performance hierarchy. In response to determining that a value for a metric is below a predefined threshold, the system can execute a mitigation operation configured to improve the metric value (e.g., relative to a baseline). Subsequent to executing the mitigation operation, the system can generate an updated graphical user interface indicating that a second hierarchical level is assigned to the store based on updated metric values computed for the store using an updated set of data. The second hierarchical level may be higher in the predefined performance hierarchy than the first hierarchical level.

20 Claims, 6 Drawing Sheets

(56) References Cited

U.S. PATENT DOCUMENTS

| | | | |
|---|---|---|---|
| 2012/0116850 A1* | 5/2012 | Abe | G06Q 10/067 |
| | | | 705/7.38 |
| 2014/0046722 A1* | 2/2014 | Rosenbloom | G06Q 10/06 |
| | | | 702/19 |
| 2015/0120359 A1* | 4/2015 | Dongieux | G06F 16/285 |
| | | | 705/7.15 |
| 2016/0171414 A1* | 6/2016 | Lee | G06Q 10/06393 |
| | | | 705/7.39 |
| 2018/0089288 A1* | 3/2018 | Haggie | G06F 16/90335 |
| 2019/0095478 A1 | 3/2019 | Tankersley et al. | |
| 2019/0205823 A1* | 7/2019 | Karmakar | G06Q 10/087 |
| 2020/0065727 A1* | 2/2020 | Connell | G06Q 10/087 |
| 2020/0160237 A1* | 5/2020 | Farooq | G06Q 30/0201 |
| 2020/0233391 A1 | 7/2020 | Ma et al. | |
| 2020/0246985 A1* | 8/2020 | Yoshida | B25J 19/06 |
| 2020/0302367 A1* | 9/2020 | Patel | G06Q 10/06393 |
| 2021/0027231 A1* | 1/2021 | Ruble | G06Q 10/06393 |
| 2021/0293875 A1* | 9/2021 | Griffin | G01R 31/2612 |
| 2021/0374836 A1* | 12/2021 | Bronicki | G06Q 30/0201 |
| 2022/0021697 A1* | 1/2022 | Adamson | H04L 63/20 |
| 2022/0083046 A1 | 3/2022 | Cella et al. | |
| 2023/0237404 A1* | 7/2023 | Jayathirtha | G06Q 10/0635 |
| | | | 705/7.28 |

\* cited by examiner

| Levels | Employee | Customer | Store |
|---|---|---|---|
| Level 4+ Set the Pace — Lead the way (<1% stores) | | Stores progress to Level 4 once all following metrics fulfill thresholds | |
| | R13W Hourly Turnover: <15% Hours Per Employee: 22+ AvE: 99.25 to 100.75% SCR vs. Target: <105% NC vs. Budget: <100% Training vs. Budget: <100% | Customer Connection: 55%+ Store Ops Score: 70%+ | MOP Uptime: 95%+ Peak OTW Time: <55s FSA Inspections: Minor Pest(s) over L3M Waste % of Sales: >50th percentile Controllable Contribution: 45%+ Sales Var vs. Plan: Positive to PY |
| Level 3 Elevate Performance — Aim for excellence (25-30% stores) | | Stores progress from Level 1 to Level 2 when only one of the following metrics falls below threshold Stores to progress to Level 3 once all metrics fulfill thresholds | |
| Level 2 Close the Gap — Own your business (25-30% stores) | R13W Hourly Turnover: <25% Quick Quits: <25% Shift Completion: 90%+ Hours Per Employee: 18+ AvE: 98% to 102% SCR vs. Minimum: 90%+ Training Completion: Excluded | Customer Connection: 35%+ Store Ops Score: 60%+ | MOP Uptime: 90%+ Peak OTW Time: <70s Inventory Count Completion: 90%+ FSA Inspections: Major Pest(s) over L3M |
| Level 1 Build the Foundations — Establish the basics (25-30% stores) | | | |
| Urgent Support Required Solve critical issues (10-15% stores) | Stores classified as Urgent Action when performance below critical level across any of the following metrics: | | |
| | Shift Completion: <85% No SM in Place for 6 weeks | Supply Chain Service Escalations: 1+ in L6W | HI DRFs: 1+ Hit/10 active store days Critical Pest FSA Inspections: Any Critical(s) over L3M Pest Work Tasks: 1.5+ per month over L3M Tech & Equipment Uptime: <95% |

SYSTEM AND GRAPHICAL USER INTERFACE FOR PROVIDING STORE-LEVEL DIAGNOSTICS AND REMEDIATION

TECHNICAL FIELD

The present disclosure relates generally to diagnostics and remediation. More specifically, but not by way of limitation, this disclosure relates to a system and graphical user interface for providing store-level diagnostics and remediation.

BACKGROUND

Stores can have various kinds of physical equipment such as computer systems, ice machines, drive-thru terminals, and coffee machines. This equipment must be periodically maintained or replaced for the store to operate properly. When such equipment breaks or is used sub-optimally, it can directly or indirectly affect the performance of the store. For instance, if a computer system at the store is running too slow or is offline too frequently, it may have various downstream affects that reduce the throughput of the store. Other factors can also affect the performance of the store.

SUMMARY

One example of the present disclosure includes a system comprising one or more processors; and one or more memories including instructions that are executable by the one or more processors for causing the one or more processors to perform operations. The operations can include generating a graphical user interface indicating that a first hierarchical level is assigned to a store based on metric values computed for the store using a set of data related to the store. The first hierarchical level can be a level in a predefined performance hierarchy. The metric values can include at least an uptime metric value related to an uptime of a computer system located at the store. The operations can include, in response to determining that the uptime metric value is below a predefined threshold, executing a mitigation operation configured to increase the uptime metric value. The operations can include, subsequent to executing the mitigation operation, generating an updated graphical user interface indicating that a second hierarchical level is assigned to the store based on updated metric values computed for the store using an updated set of data. The second hierarchical level can be higher in the predefined performance hierarchy than the first hierarchical level. The updated metric values can include at least an updated uptime metric value related to the uptime of the computer system located at the store.

Another example of the present disclosure includes a method of operations. The operations can include generating a graphical user interface indicating that a first hierarchical level is assigned to a store based on metric values computed for the store using a set of data related to the store. The first hierarchical level can be a level in a predefined performance hierarchy. The metric values can include at least an uptime metric value related to an uptime of a computer system located at the store. The operations can include, in response to determining that the uptime metric value is below a predefined threshold, executing a mitigation operation configured to increase the uptime metric value. The operations can include, subsequent to executing the mitigation operation, generating an updated graphical user interface indicating that a second hierarchical level is assigned to the store based on updated metric values computed for the store using an updated set of data. The second hierarchical level can be higher in the predefined performance hierarchy than the first hierarchical level. The updated metric values can include at least an updated uptime metric value related to the uptime of the computer system located at the store. Some or all of the operations can be performed by one or more processors.

Still another example of the present disclosure includes a non-transitory computer-readable medium comprising program code that is executable by one or more processors for causing the one or more processors to perform operations. The operations can include generating a graphical user interface indicating that a first hierarchical level is assigned to a store based on metric values computed for the store using a set of data related to the store. The first hierarchical level can be a level in a predefined performance hierarchy. The metric values can include at least an uptime metric value related to an uptime of a computer system located at the store. The operations can include, in response to determining that the uptime metric value is below a predefined threshold, executing a mitigation operation configured to increase the uptime metric value. The operations can include, subsequent to executing the mitigation operation, generating an updated graphical user interface indicating that a second hierarchical level is assigned to the store based on updated metric values computed for the store using an updated set of data. The second hierarchical level can be higher in the predefined performance hierarchy than the first hierarchical level. The updated metric values can include at least an updated uptime metric value related to the uptime of the computer system located at the store.

DETAILED DESCRIPTION

Certain aspects and features of the present disclosure relate to a diagnostic system with a graphical user interface for providing store-level diagnostics and remediation. The graphical user interface can be accessible upon logging into an account, where different users may be granted access to different amounts and types of information available through the graphical user interface. One type of information that can be presented in the graphical user interface can be a hierarchical level assigned to a store. The hierarchical level is a level in a hierarchy, where the level is determined based on metric values derived from data gathered about the store. There can be any number of hierarchical levels in the hierarchy. For example, there may be four levels in the hierarchy. Each level can have a set of criteria that must be met to move on to the next level. A store can progress through the series of hierarchical levels based on the store's metric values satisfying the criteria for the current and prior levels, with the goal being to achieve the highest level in the hierarchy. Over time, the graphical user interface can be dynamically updated to reflect the current hierarchical level assigned to the store based on the most recent set of metric values computed for the store. Thus, the hierarchical level for the store can change over time depending on its metric values. The graphical user interface can also present the metric values and flag certain metric values that may be insufficient to move on to the next level in the hierarchy. By assigning a hierarchical level to the store and flagging problematic metric values, the store's performance can be easily traced over time and problems diagnosed at the store-level, so that they can be remedied.

The diagnostic system can generate the metrics for the store based on collected data about the store. In some examples, the data can include sensor data collected from Internet of Things (IoT) devices and sensors positioned in the store. Examples of such sensors can include cameras, barcode scanners, flowrate sensors, depth sensors, inclinometers, accelerometers, global positioning system (GPS) units, infrared sensors, proximity sensors, pressure sensors, ultrasonic transducers, thermometers, gyroscopes, humidity sensors, level sensors, photo detectors, capacitive sensors, or any combination of these. The sensors can provide sensor data to the diagnostic system for further evaluation. Based on the sensor data and/or other information (e.g., collected by a human), the diagnostic system can compute the metric values and determine an appropriate level in the hierarchy for the store. The diagnostic system can then output the determined hierarchical level in the graphical user interface. Over time, the diagnostic system can continue to automatically and dynamically collect data from the IoT devices and sensors, re-compute the metric values, and update the assigned hierarchical level to the store.

In some examples, the diagnostic system can automatically execute one or more mitigation operations to help remediate one or more problems identified for the store. For example, the diagnostic system can determine that a particular metric value is less than a predefined threshold (or exceeds a predefined threshold, depending on the metric). In response, the diagnostic system can determine a mitigation operation to perform and then execute the mitigation operation. The diagnostic system may determine which mitigation operation to perform for which problems using a predefined lookup table that correlates mitigation operations to problems. In response to identifying the problem (e.g., that the metric value is less than the predefined threshold), the diagnostic system can use the lookup table to identify the appropriate mitigation operation and then automatically execute the mitigation operation. In this way, the diagnostic system can be self-healing in that it can identify a problem associated with the store and help to resolve the problem, thereby automatically helping the store to advance up the hierarchy.

In some examples, the diagnostic system can also execute a machine-learning model to generate forecasted metric values for the store over a future timespan. Examples of the machine-learning model can include a neural network, an autoregressive moving average (ARIMA) model, an exponential smoothing model (ESM), or any combination of these. Based on the forecasted metric values, the diagnostic system can determine a predicted hierarchical level for the store during the future timespan. The diagnostic system can configure the graphical user interface to include the predicted hierarchical level and/or the forecasted metric values, which can help to preemptively predict future problems with the store so that they can be avoided or resolved. If a future problem is predicted, the diagnostic system can automatically determine and execute one or more mitigation operations to help avoid the problem.

In some examples, the diagnostic system may perform some or all of the above operations in real time. For instance, the diagnostic system can receive new data at periodic intervals from various sources, such as sensors, IoT devices, or store managers. Since the new data may be in multiple different formats, in response to receiving the new data, the diagnostic system can normalize the new data into a standardized format for analysis. The diagnostic system may then automatically update that the metric values in real time based on the new data in the standardized format. After computing the updated metric values, the diagnostic system can automatically assign an updated hierarchical level to the store. The updated hierarchical level may be the same as or different than the prior hierarchical level assigned to the store. The diagnostic system may then automatically notify one or more users in real time that this information has been updated and may also provide other relevant details, such as the updated hierarchical level and the updated metrics. This can allow the users to have immediate access to up-to-date information about the store. Additionally or alternatively, the diagnostic system can automatically notify the users in response to detecting a change in the store's hierarchical level or a problem associated with the store, such as a metric value that is unacceptably higher or low. Such notifications can be transmitted over a computer network (e.g., the Internet) to some or all of the users associated with the store, such as its manager. The notifications can take any suitable form, such as an email message, text message, or other types of message. This can allow the users to be quickly notified of any changes or problems so that they can begin taking remedial action.

In some examples, the above metrics can relate to the operation of electronic and/or mechanical systems at the store. For instance, the store may have a computer system through which it authorizes electronic payments. One of the metrics may relate to the uptime of this computer system. Lower uptime may be less desirable than higher uptime. The diagnostic system can automatically analyze uptime data related to the computer system, determine that it is less than a predefined threshold, and execute one or more mitigation operations configured to improve the uptime of the computer system. Examples of the mitigation operations may include issuing a command to restart the computer system, providing a software update to the computer system, generating a support ticket for a maintenance worker to assess the computer system, or reconfiguring a setting of the computer system. Through this process, the diagnostic system can improve the uptime and thus the operation of the computer system. Similar principles can be applied to improve the functionality of other physical devices at the store, such as appliances (e.g., ice makers, refrigerators, coffee grinders, microwaves, etc.) that may have one or more attached sensors for monitoring their operation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
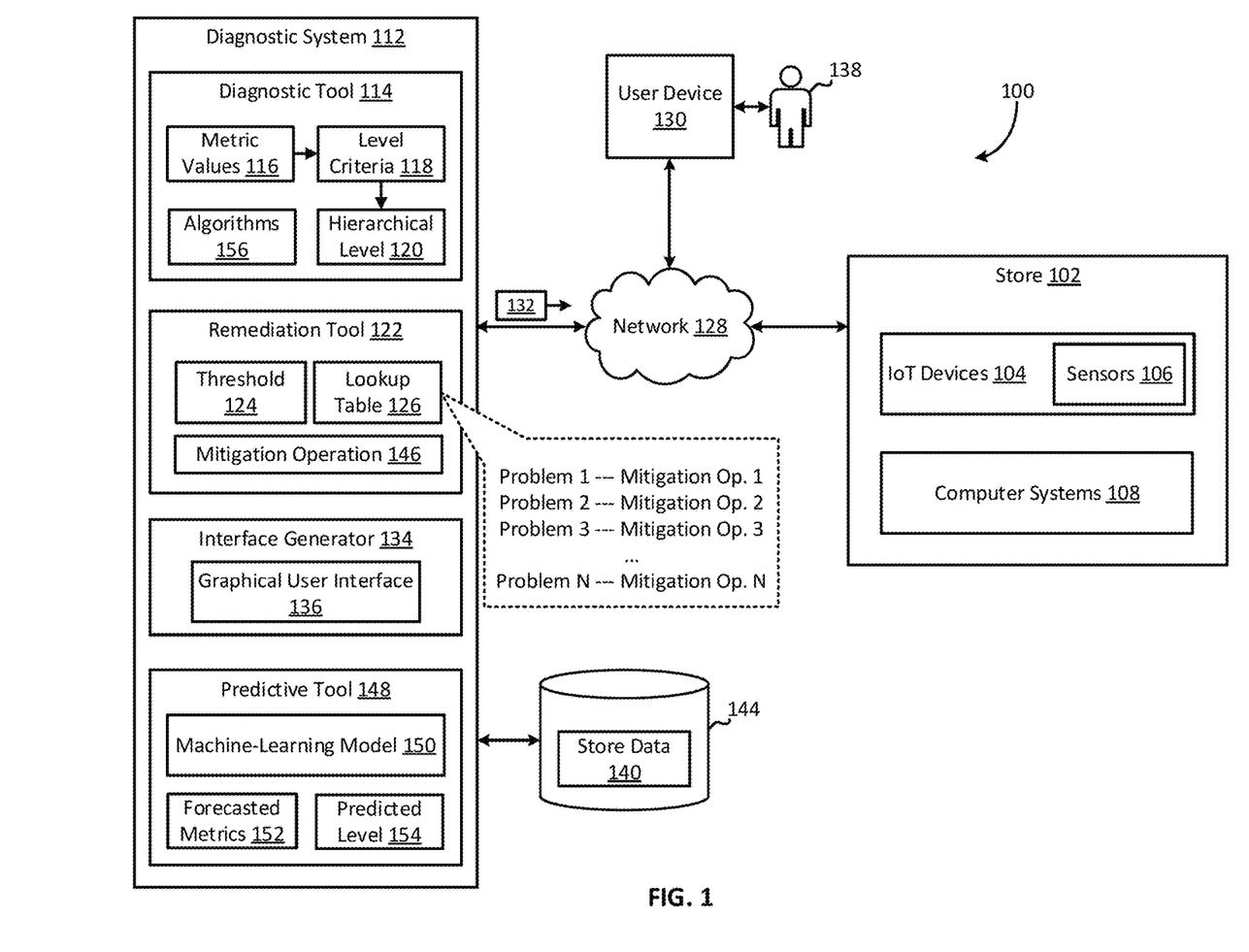
FIG. 1 is a block diagram of an example of a system for store-level diagnostics and remediation according to some aspects of the present disclosure.

FIG. 1 is a block diagram of an example of a system 100 for store-level diagnostics and remediation according to some aspects of the present disclosure. The system 100 includes a store 102 at which one or more products can be manufactured or sold. Examples of the products can include beverages, food items, and apparel.

The store 102 can include one or more IoT devices, such as smart appliances (e.g., refrigerators, microwaves, ice machines, etc.), sensors 106, etc. Examples of the sensors 106 can include cameras, barcode scanners such as QR code scanners, thermometers, humidity sensors, or any combination of these. The store 102 can also include one or more computer systems 108, such as payment terminals, ordering systems, and employee management systems. The store 102 may further include other physical equipment, such as kitchen appliances, 3D printers, robots, ovens or kilns, mixers, grinders, containers, cooling systems, etc.

The store 102 can transmit data about the functioning of some or all of the IoT devices 104, the computer systems 108, and the other physical equipment to a diagnostic system 112 via one or more networks 128. The networks 128 can include a private network (e.g., a LAN), a public network (e.g., the Internet), or a combination of these. The store 102 may also transmit other data about store operations to the diagnostic system 112 via the networks 128. For instance, the store 102 can periodically transmit data about employee turnover, pest control operations, and waste management to the diagnostic system 112. The diagnostic system 112 can receive some or all of the abovementioned data and save it as store data 140 in one or more databases 144. In this way, the diagnostic system 112 can receive store data 140 including any information related to the performance of the store 102.

In some examples, the store data 140 can include one or more time series that span a particular time window. For example, the store 102 may periodically transmit the store data 140 to the diagnostic system 112 at a certain interval, such as weekly interval. When the store data 140 is periodically transmitted at an interval, the store data 140 may include one or more time series that are collected during and span that interval. Each time series can indicate a performance characteristic of the store 102 over a prior time window. And each data point in the time series can correspond to a particular time and value during that time window. For instance, the sensors 106 can each generate a respective time series that includes a sequence of sensor measurements taken over the particular time window. As another example, the computer systems 108 can each generate a respective time series that includes a sequence of data points over the particular time window. The sequence of data points may correspond to at least one functional characteristic of the computer system. For instance, the sequence of data points may indicate processor consumption, memory consumption, bandwidth consumption, storage consumption, uptime, downtime, or latency during the particular time window. The store 102 can transmit this store data 140 (e.g., the one or more time series) to the diagnostic system 112 via the networks 128 for analysis.

Figure 2:
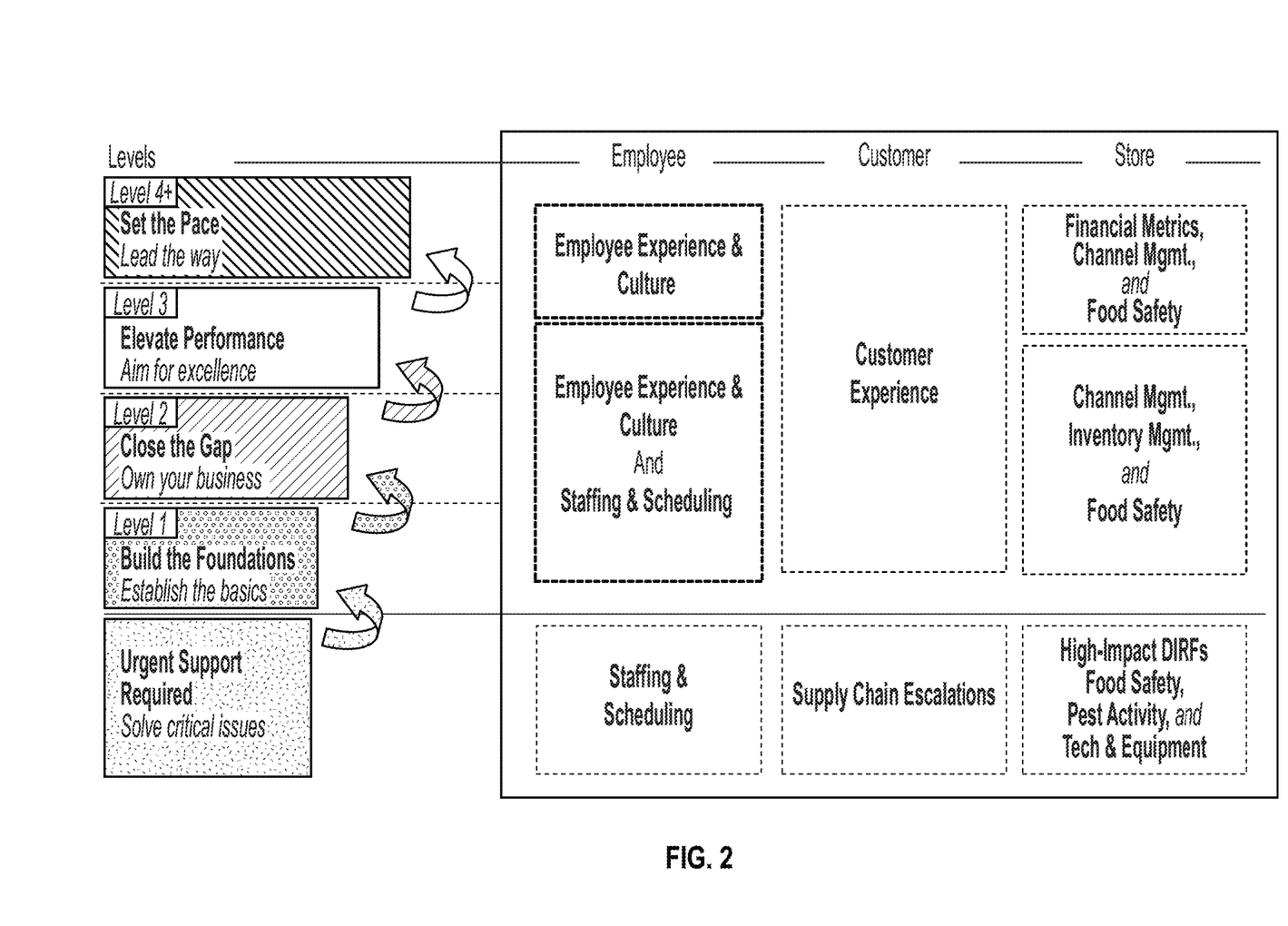
FIG. 2 is an example of a store-level hierarchy according to some aspects of the present disclosure.

The diagnostic system 112 can include a diagnostic tool 114. The diagnostic tool 114 includes software that is executable to compute one or more values 116 for one or more metrics based on the store data 140. The metrics may be performance metrics related to the store's performance. Examples of the metrics 116 can broadly fall into various categories, as shown in FIG. 2. Some of those broad categories can include employee experience and culture, staffing and scheduling, financial metrics, food safety metrics, pest activity metrics, channel management metrics, technology and equipment metrics, etc. As one particular example, the diagnostic system 112 can receive store data 140 from a computer system 108 indicating the computer system's 108 uptime over the last time interval. The diagnostic system 112 can then compute an uptime metric value (i.e., a value for an uptime metric) for the computer system's 108 based on the store data 140. As another example, the diagnostic system 112 can receive store data 140 from an IoT device 104, such as a smart refrigerator. The store data 140 can indicating the smart refrigerator's temperature fluctuations over a time interval. The diagnostic system 112 can then compute a temperature metric value (i.e., a value for a temperature metric) for the smart refrigerator based on the store data 140.

Because the store data 140 can originate from various sensors, devices, and other sources (e.g., human input) that may provide information in different formats, in some examples the diagnostic tool can include one or more normalization algorithms 156 or normalization tables usable to normalize the store data 140 into a standard format. A normalization table can be a lookup table usable to translate information between different formats. After the store data 140 has been normalized, the store data 140 may then be used to compute the various matric values 116. Normalizing the store data 140 can make it easier for the automated logic of the diagnostic tool 114 to analyze the information from the different sources to derive the metric values 116.

Figure 3:
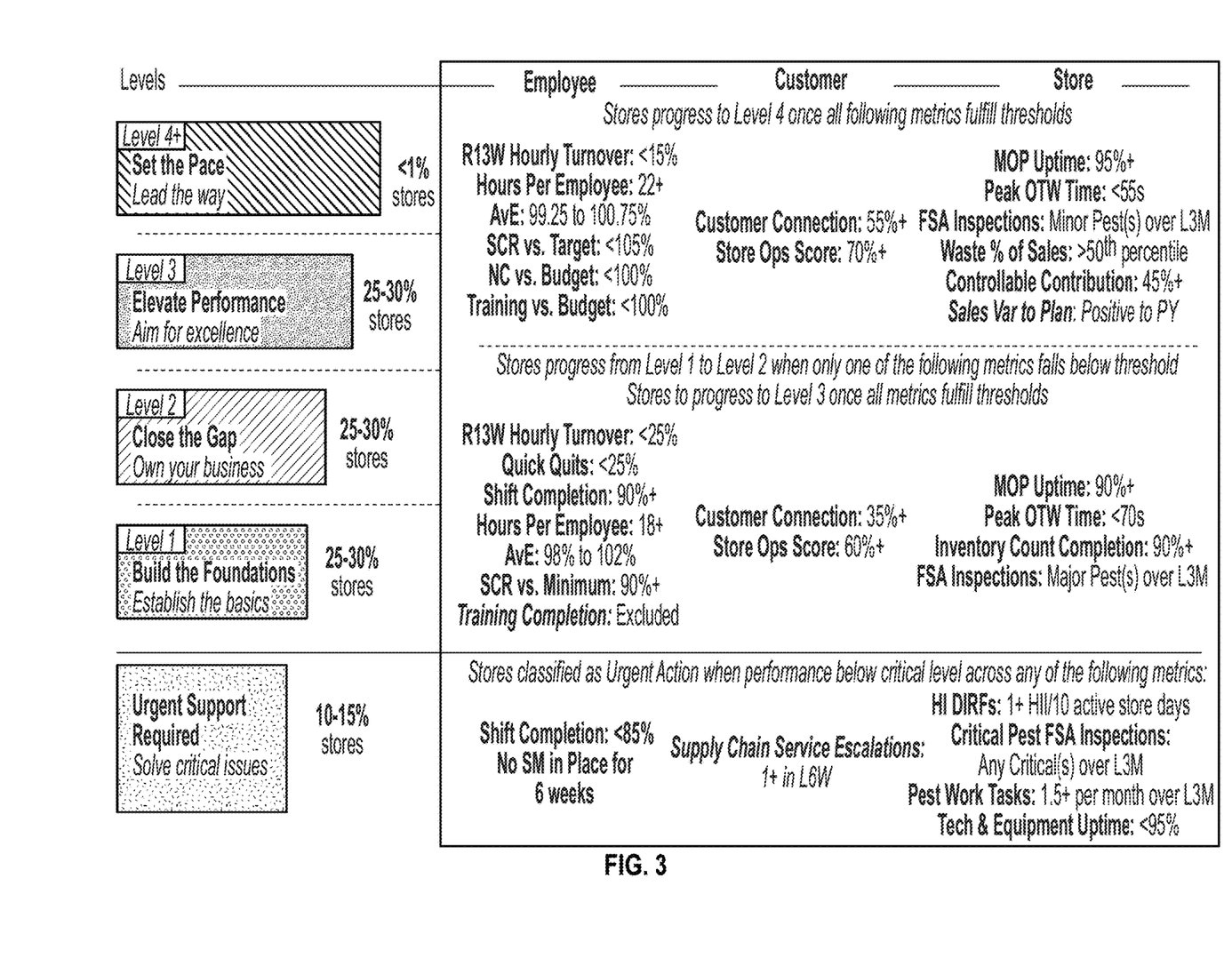
FIG. 3 is an example of a store-level hierarchy with metric values according to some aspects of the present disclosure.
Figure 4:
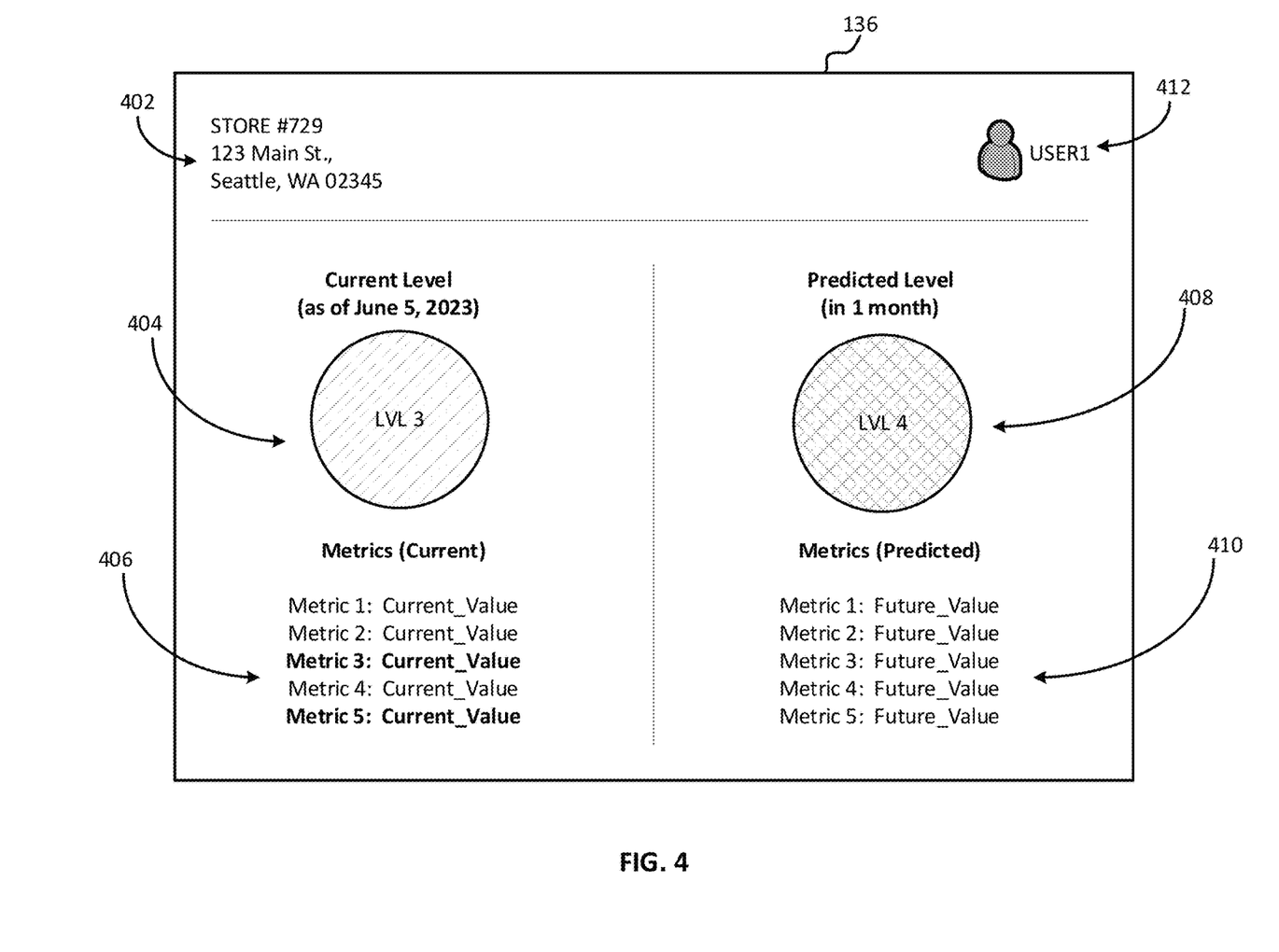
FIG. 4 is an example of a graphical user interface according to some aspects of the present disclosure.

After generating the metric values 116, the diagnostic tool 114 can apply level criteria 118 to the metric values 116 determine a hierarchical level 120 to assign to the store 102. For example, there can be a performance hierarchy that includes two or more distinct levels through which the store 102 can progress depending on its performance. Lower levels may correspond to weaker performance and higher levels may correspond to stronger performance. Each level can have a set of criteria that must be satisfied to move on to the next level. For instance, each level can have a set of predefined thresholds that must be met or surpassed by corresponding metric values 116 for the store 102 to move on to the next level of the hierarchy. The diagnostic tool 114 can apply the level criteria 118 to the metric values 116 computed for the store 102 to determine the store's current level 120 in the hierarchy. One specific example is shown in FIGS. 2-3, which involve a four-level hierarchy. The lowest level is Level 1 and the highest level is Level 4. Stores begin at Level 1 and progress upward as they satisfy the depicted criteria for each level. As shown in FIG. 4, the criteria for each level involves the store's metric values 116 being above or below corresponding thresholds. Of course, these combinations of level criteria are intended to be illustrative and non-limiting. Other examples may involve other combinations of level criteria for each level of the hierarchy.

Continuing with FIG. 1, after generating the metric values 116, the diagnostic system 112 can execute a remediation tool 122. The remediation tool 122 can include software configured to determine one or more mitigation operations 146 to execute to help resolve an identified issue, which in turn may advance the store 102 to the next level in the hierarchy. More specifically, the remediation tool 122 can ingest the metric values 116 and identify one or more problems with respect to the metric values 116. A metric value can be considered problematic if it does not satisfy the criteria 118 to advance to the next level of the hierarchy (e.g., the metric value does not meet or exceed a predefined threshold required to advance to the next level). A metric value can also be considered problematic for other reasons, such as if it is so low that it falls beneath an acceptability threshold 124. An acceptability threshold can be a threshold above or beneath which the metric value is considered unacceptable. For instance, an employee-turnover metric may be considered problematic if it meets or exceeds an acceptability threshold 124. As another example, a production metric may be considered problematic if it is below an acceptability threshold 124. The remediation tool 122 can compare the metric values 116 to the level criteria 118 and/or the acceptability thresholds 124 to identify one or more problematic metrics.

In response to identifying a problematic metric, the remediation tool 122 can determine a mitigation operation 146 configured to improve the problematic metric. For example, the remediation tool 122 can access a lookup table 126 that correlates problems (e.g., problematic metrics) to mitigation operations. Using the lookup table 126, the remediation tool 122 can map the problematic metric to a corresponding mitigation operation 146. The remediation tool 122 can then execute the mitigation operation 146 to help resolve the problem.

One example of a mitigation operation 146 can involve issuing a command to a computer system 108, such as network hardware, at the store 102. The command may be a reboot command or another command. Issuing a reboot command to the computer system 108 may help resolve various operational errors, for example due to a filled memory or a stalled software process. Another example of a mitigation operation 146 can involve allocating more computing resources or bandwidth from a resource pool to performing interactions with the computer system 108. This may help improve speed, latency, and responsiveness of the computer system 108. Another example of a mitigation operation 146 may involve issuing a support ticket to a remediation team with details about the deficient metric. This may help the remediation team identify and respond to the problem. As yet another example, the mitigation operation 146 can involve transmitting a notification 132 to one or more user devices 130 of one or more users 138, such as managers or employees associated with the store 102. Examples of the user device 130 can include a laptop computer, desktop computer, mobile phone, e-reader, or wearable device (e.g., a smart watch). The notifications 132 can include the problematic metric value and other details, such as the hierarchical level 120 assigned to the store 102. This can help the user 138 understand the problem as well as the store's 102 current progression in the hierarchy, for example so that the user 138 can resolve the problem and ideally move to the next level in the hierarchy.

In some examples, the diagnostic system 112 can also execute an interface generator 134 to generate and update a graphical user interface 136. The graphical user interface 136 can include some or all of the metric values 116, the hierarchical level 120 assigned to the store 102, and other information. The diagnostic system 112 can provide the graphical user interface 136 to a user 138 via the one or more networks 128. The user 138 may be associated with the store 102. For example, the user 138 may be a manager of the store 102. Over time, as the metric values are periodically recomputed and the hierarchical level 120 is updated, the interface generator 134 can dynamically update the graphical user interface 136 to reflect those changes. This can help keep the graphical user interface 136 up-to-date.

In some examples, the diagnostic system 112 can include a predictive tool 148 configured to predict the store's metric values and/or hierarchical level 120 at a future point in time. These predictions can be incorporated into the graphical user interface 136 by the interface generator 134, which may help a user 138 understand the direction in which the store 102 is trending and perform various actions to help guide the store 102 in one direction or the other.

More specifically, the predictive tool 148 can include a machine-learning model 150. Examples of the machine-learning model 150 can include a neural network, an ARIMA model, an ESM, or any combination of these. The diagnostic system 112 can execute the machine-learning model 150 to generate forecasted metric values 152 for the store at a future point in time or over a future time window. Based on the forecasted metric values 152, the diagnostic system 112 can determine a predicted hierarchical level 154 of the store. For example, the diagnostic system 112 (e.g., the diagnostic tool 114) can apply the level criteria 118 to the forecasted metric values 152 to determine the predicted hierarchical level 154. The diagnostic system 112 (e.g., the interface generator 134) may then configure the graphical user interface 136 to include the predicted hierarchical level 154 or the forecasted metric values 152, which can help to preemptively predict future problems with the store 102 so that they can be avoided or resolved. Additionally or alternatively, the diagnostic system 112 (e.g., the remediation tool 122) can apply the acceptability thresholds 124 to the forecasted metric values 152 to detect one or more deficient metrics or other problems. If any such problem is predicted, the diagnostic system 112 can automatically determine and execute one or more mitigation operations 146 to help avoid or resolve the problem.

The machine-learning model 150 can be trained using training data, such as labeled training data usable in a supervised training process. The training data may include, for example, relationships between store data and metric values. The store data may have been collected from one or more stores over a prior time window. After being trained on the training data, the machine-learning model 150 may be able to predict metric values for the store 102 at a future point in time (or over a future time window) based on its current store data 140.

As noted above, the diagnostic system 112 can generate a graphical user interface 136 that is accessible to one or more users. The graphical user interface 136 can include current or predicted information about the store 102. One example of such a graphical user interface 136 is shown in FIG. 4. As shown, the graphical user interface 136 can include store details 402, such as its name and address. The graphical user interface 136 can also include current store information, such as a current level indicator 404 that indicates a current level of the store 102 in the hierarchy, and a current set of metric values 406 for the store 102. The graphical user interface 136 may further include predicted store information, such as a predicted level indicator 408 that indicates a predicted level of the store 102 at a future point in time, and a predicted set of metric values 410 for the store 102 at that future point in time. The graphical user interface 136 may also include a user identifier 412 indicating who is currently signed in. Different users may have different accounts for which different levels of access to the graphical user interface 136 may be granted. Some users may have more access than others. Users with more access may be able to view more information in the graphical user interface 136, such as information about multiple stores rather than just a single store.

Figure 5:
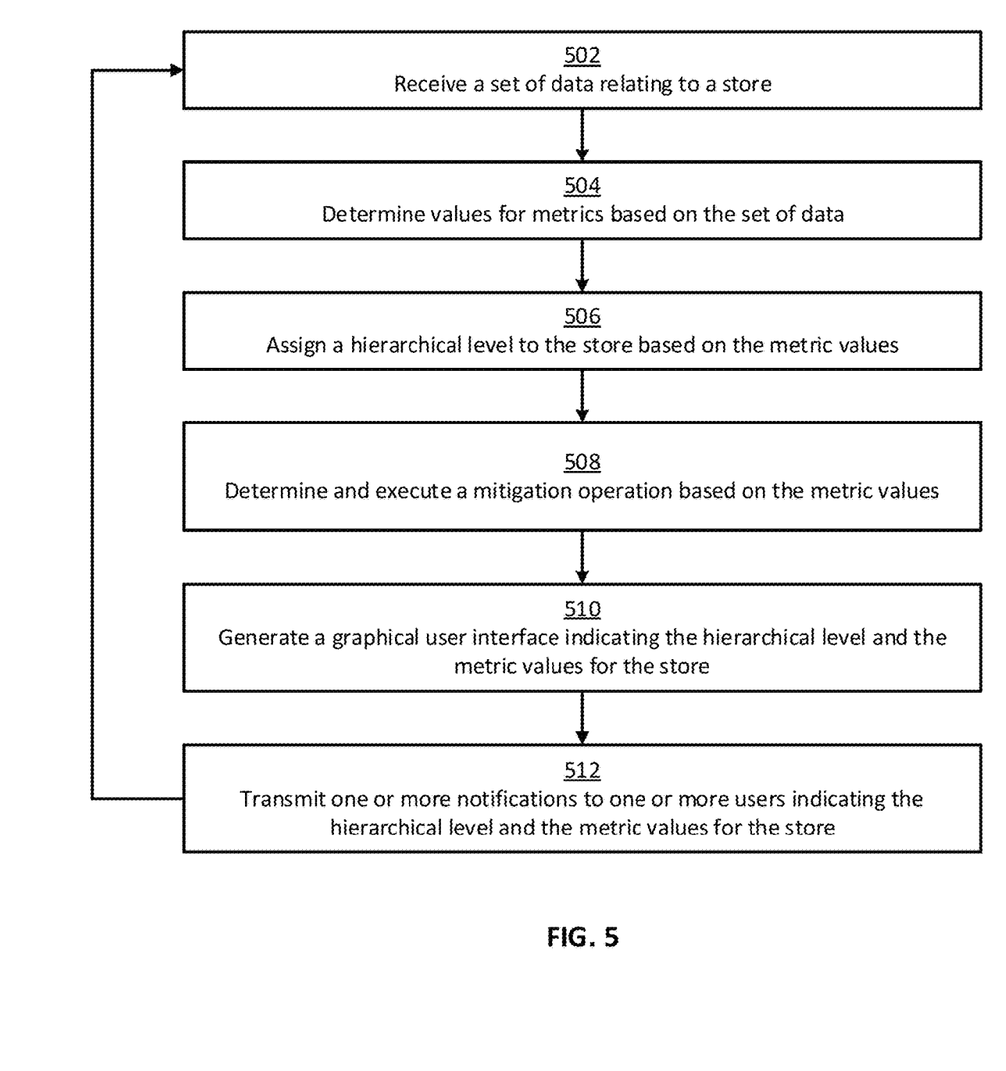
FIG. 5 is a flowchart of an example of a process for store-level diagnostics and remediation according to some aspects of the present disclosure.

FIG. 5 is a flowchart of an example of a process for providing store-level diagnostics and remediation according to some aspects of the present disclosure. Other examples may involve more operations, fewer operations, different operations, or a different sequence of operations than is shown in FIG. 5. The operations of FIG. 5 are described below with reference to the components of FIG. 1 above.

In block 502, a diagnostic system 112 receives a set of data (e.g., store data 140) relating to a store 102. The diagnostic system 112 can receive the set of data from the store 102 or another source. The diagnostic system 112 can receive the set of data via one or more networks 128, such as the Internet. The set of data may include one or more time series spanning a prior time window. Each time series may include data points collected by IoT devices 104, sensors 106, computer systems 108, etc.

In block 504, the diagnostic system 112 determines values for metrics (i.e., metric values) based on the set of data. For example, the diagnostic system 112 can apply one or more predefined algorithms to the set of data to derive the metric values. In some examples, the metric values can be expressed as absolute numbers, ratios, or percentages.

In block 506, the diagnostic system 112 assigns a hierarchical level 120 to the store 102 based on the metric values. For example, the diagnostic system 112 can apply the level criteria 118 assigned to each level in a hierarchy to determine which level in the hierarchy fits the store 102.

In block 508, the diagnostic system 112 determines and executes a mitigation operation 146 based on the metric values 116. For example, the diagnostic system 112 can determine that a metric value is below a predefined threshold, such as acceptability threshold 124. In response to determining that the metric value 116 is below the predefined threshold, the diagnostic system 112 can determine a mitigation operation 146 configured to increase the metric value. The diagnostic system 112 may use a lookup table 126, algorithm, or another approach to determine the mitigation operation 146 based on the metric value. After determining the mitigation operation 146, the diagnostic system 112 can execute the mitigation operation 146.

In block 510, the diagnostic system 112 generates a graphical user interface 136 indicating the hierarchical level 120 assigned to the store 102 and/or the metric values 116 computed for the store 102. The graphical user interface 136 may have various graphical input elements through which a user can interact with the graphical user interface 136, for example to view more or less information about the store 102.

In block 512, the diagnostic system 112 transmits one or more notifications to one or more users indicating the hierarchical level 120 and/or the metric values 116 for the store 102. This may involve transmitting the notifications to the user devices of the one or more users in real time (e.g., soon after computing the hierarchical level 120 and/or the metric values 116). This may help keep the users up-to-date about the store 102, without the users having to manually access to the graphical user interface 136 periodically to determine whether there is any new information.

Over time, the diagnostic system 112 may receive a new set of data relating to the store 102. In response, some or all of the process shown in FIG. 5 can iterate. For example, the diagnostic system 112 can determine an updated set of metric values and an updated hierarchical level based on the new set of data. The diagnostic system 112 can then update the graphical user interface 136 and transmit notifications about the update. These operations may be performed in real time (e.g., immediately after receiving the new set of data).

Figure 6:
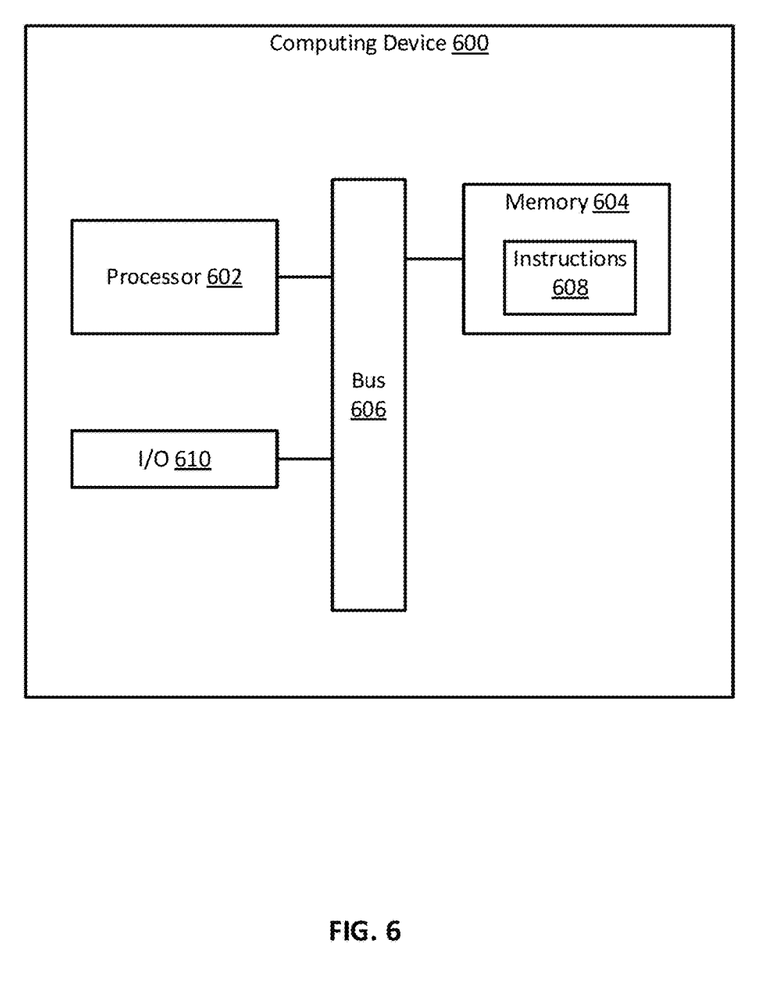
FIG. 6 is a block diagram of a computing system usable to implement some aspects of the present disclosure.

FIG. 6 is a block diagram of a computing device 600 usable to implement some aspects of the present disclosure. In some examples, the computing device 600 may be part of the diagnostic system 112, the user device 130, or the computer systems 108 of FIG. 1.

The computing device 600 includes a processor 602 coupled to a memory 604 via a bus 606. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 608 stored in the memory 604 to perform operations. Examples of such operations can include any of the operations described above with respect to the diagnostic system 112. In some examples, the instructions 608 can include processor-specific instructions generated by a compiler or an interpreter from code written in any suitable computer-programming language, such as C, C++, C#, Python, or Java.

The memory 604 can include one memory device or multiple memory devices. The memory 604 can be volatile or non-volatile, such that the memory 604 retains stored information when powered off. Examples of the memory 604 include electrically erasable and programmable read-only memory (EEPROM), flash memory, or any other type of non-volatile memory. At least some of the memory device can include a non-transitory computer-readable medium from which the processor 602 can read instructions 608. A computer-readable medium can include electronic, optical, magnetic, or other storage devices capable of providing the processor 602 with computer-readable instructions or other program code. Examples of a computer-readable medium can include magnetic disks, memory chips, ROM, random-access memory (RAM), an ASIC, a configured processor, optical storage, or any other medium from which a computer processor can read the instructions 608.

The computing device 600 may also include input and output (I/O) components 610. Examples of the input components can include a mouse, a keyboard, a microphone, a trackball, a touch pad, a touch-screen display, or any combination of these. Examples of the output components can include a visual display such as a LCD display or a touch-screen display; an audio display such as speakers; a haptic display such as a piezoelectric device or an eccentric rotating mass (ERM) device; or any combination of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
one or more processors; and
one or more memories including instructions that are executable by the one or more processors for causing the one or more processors to execute an iterative monitoring process for dynamically and automatically detecting and mitigating an uptime problem in relation to a computer system at a store, wherein each iteration of the iterative monitoring process involves dynamically and automatically recomputing a set of metric values based on a corresponding set of data and assigning a hierarchical level to the store based on the recomputed set of metric values, wherein the recomputed set of metric values includes an uptime metric value associated with the computer system, and wherein at least one iteration of the iterative monitoring process involves:

receiving a current set of data related to the store, the current set of data being received via one or more networks from at least one device located at the store;

automatically recomputing the set of metric values for the store using the current set of data, wherein the set of metric values includes at least a current uptime metric value that quantifies an uptime of the computer system located at the store over a time window associated with the current set of data, wherein the set of metric values includes an hours-per-employee metric indicating an average number of hours worked per employee, and wherein the set of metric values includes a peak out-the-window (OTW) time indicating how long customers wait at a drive through;

automatically determining whether the current uptime metric value meets or exceeds a predefined threshold;

in response to determining that the current uptime metric value is below the predefined threshold, automatically executing a mitigation operation configured to increase the uptime of the computer system, wherein the mitigation operation involves issuing a command to the computer system, providing a software update to the computer system, generating a support ticket for a worker to assess the computer system, or reconfiguring a setting of the computer system;

automatically determining a current hierarchical level to assign to the store as a whole based on the set of metric values, by selecting the current hierarchical level from among a plurality of hierarchical levels based on the set of metric values, wherein the plurality of hierarchical levels define a predefined performance hierarchy that includes at least three hierarchical levels, wherein each hierarchical level of the plurality of hierarchical levels has a respective set of threshold criteria that must be satisfied by the set of metric values to progress to a next level of the predefined performance hierarchy, and wherein the respective set of threshold criteria comprises a first metric value being above a first predefined threshold and a second metric value being below a second predefined threshold;

executing a machine-learning model that is configured to generate forecasted metric values for the store over a future timespan, wherein the machine-learning model is configured to generate the forecasted metric values based on the set of metric values;

determining a predicted hierarchical level of the store during the future timespan based on the forecasted metric values; and automatically generating a graphical user interface configured to indicate the current hierarchical level assigned to the store, the set of metric values, the predicted hierarchical level for the store during the future timespan, and the forecasted metric values.

2. The system of claim 1, wherein the one or more memories further include instructions that are executable by the one or more processors for causing the one or more processors to:

receive the current set of data via a network from a plurality of remote devices, the plurality of remote devices including at least one Internet of Things (IoT) device and at least one sensor located in the store.

3. The system of claim 1, wherein the current set of data includes time series data indicating one or more performance characteristics associated with the store over a prior time window.

4. The system of claim 1, wherein the one or more memories including instructions that are executable by the one or more processors for causing the one or more processors to:

determine the mitigation operation using a lookup table.

5. The system of claim 1, wherein the set of metric values includes values for a set of metrics, wherein the set of metrics includes an employee experience metric, a staffing metric, an employee scheduling metric, a supply chain metric, a customer experience metric, a food safety metric, a pest activity metric, and an inventory metric.

6. The system of claim 1, wherein the set of metric values includes a rolling turnover rate for employees.

7. The system of claim 1, wherein the set of metric values includes a training versus budget metric indicating a percentage of budgeted training hours spent during a prior time window.

8. The system of claim 1, wherein the set of metric values includes a customer connection metric indicating customer responses to a survey question.

9. A method comprising:

executing, by one or more processors, an iterative monitoring process for dynamically and automatically detecting and mitigating an uptime problem in relation to a computer system at a store, wherein each iteration of the iterative monitoring process involves dynamically and automatically recomputing a set of metric values based on a corresponding set of data and assigning a hierarchical level to the store based on the recomputed set of metric values, wherein the recomputed set of metric values includes an uptime metric value associated with the computer system, and wherein at least one iteration of the iterative monitoring process involves:

receiving a current set of data related to the store, the current set of data being received via one or more networks from at least one device located at the store;

automatically recomputing the set of metric values for the store using the current set of data, wherein the set of metric values include at least a current uptime metric value that quantifies an uptime of the computer system located at the store over a time window associated with the current set of data, and wherein the set of metric values includes an hours-per-employee metric indicating an average number of hours worked per employee;

automatically determining whether the current uptime metric value meets or exceeds a predefined threshold;

in response to determining that the current uptime metric value is below the predefined threshold, automatically executing a mitigation operation configured to increase the uptime of the computer system, wherein the mitigation operation involves issuing a command to the computer system, providing a software update to the computer system, generating a support ticket for a worker to assess the computer system, or reconfiguring a setting of the computer system;

automatically determining a current hierarchical level to assign to the store as a whole based on the set of metric values, by selecting the current hierarchical level from among a plurality of hierarchical levels based on the set of metric values, wherein the plurality of hierarchical levels define a predefined performance hierarchy that includes at least three hierarchical levels, wherein each hierarchical level of the plurality of hierarchical levels has a respective set of threshold criteria that must be satisfied by the set of metric values to progress to a next level of the predefined performance hierarchy, and wherein the respective set of threshold criteria comprises a first metric value being above a first predefined threshold and a second metric value being below a second predefined threshold; and executing a machine-learning model that is configured to generate forecasted metric values for the store over a future timespan, wherein the machine-learning model is configured to generate the forecasted metric values based on the set of metric values;

determining a predicted hierarchical level of the store during the future timespan based on the forecasted metric values; and automatically generating a graphical user interface configured to indicate the current hierarchical level assigned to the store, the set of metric values, the predicted hierarchical level for the store during the future timespan, and the forecasted metric values.

10. The method of claim 9, further comprising:
receiving the current set of data via a network from a plurality of remote devices, the plurality of remote devices including at least one Internet of Things (IoT) device and at least one sensor located in the store.

11. The method of claim 9, wherein the current set of data includes time series data indicating one or more performance characteristics associated with the store over a prior time window.

12. The method of claim 9, wherein the set of metric values includes values for a set of metrics, wherein the set of metrics includes a staffing metric, a scheduling metric, a supply chain metric, and a food safety metric.

13. The method of claim 9, wherein the set of metric values includes a rolling turnover rate for employees.

14. The method of claim 9, wherein the set of metric values includes a training versus budget metric indicating a percentage of budgeted training hours spent during a prior time window.

15. The method of claim 9, wherein the set of metric values includes a customer connection metric indicating customer responses to a survey question.

16. A non-transitory computer-readable medium comprising program code that is executable by one or more processors for causing the one or more processors to execute an iterative monitoring process for dynamically and automatically detecting and mitigating an uptime problem in relation to a computer system at a store, wherein each iteration of the iterative monitoring process involves dynamically and automatically recomputing a set of metric values based on a corresponding set of data and assigning a hierarchical level to the store based on the recomputed set of metric values, wherein the recomputed set of metric values includes an uptime metric value associated with the computer system, and wherein at least one iteration of the iterative monitoring process involves:

receiving a current set of data related to the store, the current set of data being received via one or more networks from at least one device located at the store;

automatically recomputing the set of metric values for the store using the current set of data, wherein the set of metric values include at least a current uptime metric value that quantifies an uptime of the computer system located at the store over a time window associated with the current set of data, and wherein the set of metric values includes a peak out-the-window (OTW) time indicating how long customers wait at a drive through;

automatically determining whether the current uptime metric value meets or exceeds a predefined threshold;

in response to determining that the current uptime metric value is below the predefined threshold, automatically executing a mitigation operation configured to increase the uptime of the computer system, wherein the mitigation operation involves issuing a command to the computer system, providing a software update to the computer system, generating a support ticket for a worker to assess the computer system, or reconfiguring a setting of the computer system;

automatically determining a current hierarchical level to assign to the store as a whole based on the set of metric values, by selecting the current hierarchical level from among a plurality of hierarchical levels based on the set of metric values, wherein the plurality of hierarchical levels define a predefined performance hierarchy that includes at least three hierarchical levels, wherein each hierarchical level of the plurality of hierarchical levels has a respective set of threshold criteria that must be satisfied by the set of metric values to progress to a next level of the predefined performance hierarchy, and wherein the respective set of threshold criteria comprises a first metric value being above a first predefined threshold and a second metric value being below a second predefined threshold; and executing a machine-learning model that is configured to generate forecasted metric values for the store over a future timespan, wherein the machine-learning model is configured to generate the forecasted metric values based on the set of metric values;

determining a predicted hierarchical level of the store during the future timespan based on the forecasted metric values; and automatically generating a graphical user interface configured to indicate the current hierarchical level assigned to the store, the set of metric values, the predicted hierarchical level for the store during the future timespan, and the forecasted metric values.

17. The non-transitory computer-readable medium of claim 16, further comprising program code that is executable by the one or more processors for causing the one or more processors to:

receive the current set of data via a network from a plurality of remote devices, the plurality of remote devices including at least one Internet of Things (IoT) device and at least one sensor located in the store.

18. The non-transitory computer-readable medium of claim 16, wherein the mitigation operation involves transmitting the support ticket to a remediation team.

19. The non-transitory computer-readable medium of claim 16, wherein the current set of data includes time series data indicating one or more performance characteristics associated with the store over a prior time window.

20. The non-transitory computer-readable medium of claim 16, wherein the set of metric values includes values for a set of metrics, wherein the set of metrics includes an employee experience metric, a customer experience metric, a food safety metric, and a pest activity metric.

* * * * *